US010795233B2

(12) United States Patent
Amundson et al.

(10) Patent No.: US 10,795,233 B2
(45) Date of Patent: Oct. 6, 2020

(54) ELECTRO-OPTIC DISPLAYS (71) Applicant: E INK CORPORATION, Billerica, MA (US)

(72) Inventors: Karl Raymond Amundson, Cambridge, MA (US); Zdzislaw Jan Szymborski, Charlestown, MA (US)

(73) Assignee: E Ink Corporation, Billerica, MA (US)

( * ) Notice: Subject to any disclaimer, the term of this patent is extended or adjusted under 35 U.S.C. 154(b) by 0 days.

(21) Appl. No.: 15/355,147

(22) Filed: Nov. 18, 2016

(65) Prior Publication Data
US 2017/0139303 A1    May 18, 2017

Related U.S. Application Data (60) Provisional application No. 62/256,931, filed on Nov. 18, 2015.

(51) Int. Cl.
G02B 26/00    (2006.01)
G02F 1/167    (2019.01)
(Continued)

(52) U.S. Cl.
CPC .......... *G02F 1/167* (2013.01); *G02F 1/13306* (2013.01); *G09G 3/344* (2013.01);
(Continued)

(58) Field of Classification Search
CPC ......... G09G 3/3233; G09G 2300/0819; G09G 2300/0842; G09G 2300/0861; G09G 2320/043; G09G 2300/0852; G09G 3/3291; G09G 2310/0251; G09G 2310/0256; G09G 2310/0262; G09G 2300/0465; G09G 2300/0814; G09G 3/3258; G09G 3/3266; G09G 2310/0254
(Continued)

(56) References Cited

U.S. PATENT DOCUMENTS 5,930,026 A    7/1999    Jacobson
6,241,921 B1   6/2001    Jacobson
(Continued)

FOREIGN PATENT DOCUMENTS

EP    1462847    9/2004
EP    1482354    12/2004
(Continued)

OTHER PUBLICATIONS

Korean Intellectual Property Office; PCT/US2016/062672; International Search Report and Written Opinion; dated Feb. 8, 2017. Feb. 28, 2017.
(Continued)

Primary Examiner — Brandi N Thomas
(74) Attorney, Agent, or Firm — Zhen Bao (57) ABSTRACT Techniques and structures for measuring the kickback voltage of an active matrix electro-optic display, such as an electrophoretic display, are described. The active-matrix display includes a capacitor coupled to an electrode of the display. A signal path for measuring the kickback voltage is configured to avoid the capacitor coupled to the electrode of the display. The kickback voltage is measured one or more times during the lifetime of the display.

14 Claims, 5 Drawing Sheets (51) Int. Cl.
*G09G 3/34* (2006.01)
*G02F 1/133* (2006.01)

(52) U.S. Cl.
CPC ............ *G09G 2320/0219* (2013.01); *G09G 2320/0693* (2013.01)

(58) Field of Classification Search
USPC ........ 359/237, 242, 265–267, 270–273, 315, 359/322, 321, 290–292, 295, 296, 298
See application file for complete search history.

(56) References Cited

U.S. PATENT DOCUMENTS

| | | |
|---|---|---|
| 6,445,489 B1 | 9/2002 | Jacobson |
| 6,504,524 B1 | 1/2003 | Gates |
| 6,512,354 B2 | 1/2003 | Jacobson |
| 6,531,997 B1 | 3/2003 | Gates |
| 6,672,921 B1 | 1/2004 | Liang |
| 6,753,999 B2 | 6/2004 | Zehner |
| 6,788,449 B2 | 9/2004 | Liang |
| 6,825,970 B2 | 11/2004 | Goenaga |
| 6,866,760 B2 | 3/2005 | Paolini, Jr. |
| 6,900,851 B2 | 5/2005 | Morrison |
| 6,909,532 B2 | 6/2005 | Chung |
| 6,922,276 B2 | 7/2005 | Zhang et al. |
| 6,982,178 B2 | 1/2006 | LeCain et al. |
| 6,995,550 B2 | 2/2006 | Jacobson |
| 7,002,728 B2 | 2/2006 | Pullen et al. |
| 7,012,600 B2 | 3/2006 | Zehner |
| 7,023,420 B2 | 4/2006 | Comiskey et al. |
| 7,034,783 B2 | 4/2006 | Gates |
| 7,061,166 B2 | 6/2006 | Kuniyasu |
| 7,061,662 B2 | 6/2006 | Chung |
| 7,072,095 B2 | 7/2006 | Liang |
| 7,075,502 B1 | 7/2006 | Drzaic |
| 7,116,318 B2 | 10/2006 | Amundson et al. |
| 7,116,466 B2 | 10/2006 | Whitesides et al. |
| 7,119,772 B2 | 10/2006 | Amundson |
| 7,144,942 B2 | 12/2006 | Zang |
| 7,170,670 B2 | 1/2007 | Webber |
| 7,177,066 B2 | 2/2007 | Chung |
| 7,193,625 B2 | 3/2007 | Danner et al. |
| 7,202,847 B2 | 4/2007 | Gates |
| 7,236,291 B2 | 6/2007 | Kaga et al. |
| 7,242,514 B2 | 7/2007 | Chung |
| 7,259,744 B2 | 8/2007 | Arango |
| 7,304,787 B2 | 12/2007 | Whitesides et al. |
| 7,312,784 B2 | 12/2007 | Baucom et al. |
| 7,312,794 B2 | 12/2007 | Zehner |
| 7,327,511 B2 | 2/2008 | Whitesides et al. |
| 7,369,299 B2 | 5/2008 | Sakurai et al. |
| 7,408,699 B2 | 8/2008 | Wang |
| 7,411,719 B2 | 8/2008 | Paolini, Jr. et al. |
| 7,453,445 B2 | 11/2008 | Amundson |
| 7,492,339 B2 | 2/2009 | Amundson |
| 7,525,719 B2 | 4/2009 | Yakushiji |
| 7,528,822 B2 | 5/2009 | Amundson |
| 7,535,624 B2 | 5/2009 | Amundson |
| 7,545,358 B2 | 6/2009 | Gates et al. |
| 7,583,251 B2 | 9/2009 | Arango |
| 7,602,374 B2 | 10/2009 | Zehner et al. |
| 7,612,760 B2 | 11/2009 | Kawai |
| 7,646,530 B2 | 1/2010 | Takagi et al. |
| 7,649,674 B2 | 1/2010 | Danner |
| 7,679,813 B2 | 3/2010 | Liang |
| 7,679,814 B2 | 3/2010 | Paolini, Jr. et al. |
| 7,683,606 B2 | 3/2010 | Kang |
| 7,688,297 B2 | 3/2010 | Zehner et al. |
| 7,715,088 B2 | 5/2010 | Liang |
| 7,729,039 B2 | 6/2010 | LeCain et al. |
| 7,733,311 B2 | 6/2010 | Amundson |
| 7,733,335 B2 | 6/2010 | Zehner et al. |
| 7,787,169 B2 | 8/2010 | Abramson et al. |
| 7,839,564 B2 | 11/2010 | Whitesides et al. |
| 7,859,742 B1 | 12/2010 | Chiu |
| 7,952,557 B2 | 5/2011 | Amundson |
| 7,956,841 B2 | 6/2011 | Albert |
| 7,982,479 B2 | 7/2011 | Wang |
| 7,999,787 B2 | 8/2011 | Amundson |
| 8,009,348 B2 | 8/2011 | Zehner |
| 8,077,141 B2 | 12/2011 | Duthaler |
| 8,125,501 B2 | 2/2012 | Amundson |
| 8,139,050 B2 | 3/2012 | Jacobson et al. |
| 8,174,490 B2 | 5/2012 | Whitesides |
| 8,177,942 B2 | 5/2012 | Paolini, Jr. |
| 8,243,013 B1 | 8/2012 | Sprague |
| 8,274,472 B1 | 9/2012 | Wang |
| 8,289,250 B2 | 10/2012 | Zehner |
| 8,300,006 B2 | 10/2012 | Zhou |
| 8,305,341 B2 | 11/2012 | Arango |
| 8,314,784 B2 | 11/2012 | Ohkami |
| 8,373,649 B2 | 2/2013 | Low |
| 8,384,658 B2 | 2/2013 | Albert |
| 8,456,414 B2 | 6/2013 | Lin |
| 8,462,102 B2 | 6/2013 | Wong |
| 8,514,168 B2 | 8/2013 | Chung |
| 8,537,105 B2 | 9/2013 | Chiu |
| 8,558,783 B2 | 10/2013 | Wilcox |
| 8,558,785 B2 | 10/2013 | Zehner |
| 8,558,786 B2 | 10/2013 | Lin |
| 8,558,855 B2 | 10/2013 | Sprague |
| 8,576,164 B2 | 11/2013 | Sprague |
| 8,576,259 B2 | 11/2013 | Lin |
| 8,593,396 B2 | 11/2013 | Amundson |
| 8,605,032 B2 | 12/2013 | Liu |
| 8,643,595 B2 | 2/2014 | Chung |
| 8,665,206 B2 | 3/2014 | Lin |
| 8,681,191 B2 | 3/2014 | Yang |
| 8,730,153 B2 | 5/2014 | Sprague |
| 8,810,525 B2 | 8/2014 | Sprague |
| 8,928,562 B2 | 1/2015 | Gates et al. |
| 8,928,641 B2 | 1/2015 | Chiu |
| 8,976,444 B2 | 3/2015 | Zhang |
| 9,013,394 B2 | 4/2015 | Lin |
| 9,019,197 B2 | 4/2015 | Lin |
| 9,019,198 B2 | 4/2015 | Lin |
| 9,019,318 B2 | 4/2015 | Sprague |
| 9,082,352 B2 | 7/2015 | Cheng |
| 9,171,508 B2 | 10/2015 | Sprague |
| 9,218,773 B2 | 12/2015 | Sun |
| 9,224,338 B2 | 12/2015 | Chan |
| 9,224,342 B2 | 12/2015 | Lin |
| 9,224,344 B2 | 12/2015 | Chung |
| 9,230,492 B2 | 1/2016 | Harrington |
| 9,251,736 B2 | 2/2016 | Lin |
| 9,262,973 B2 | 2/2016 | Wu |
| 9,269,311 B2 | 2/2016 | Amundson |
| 9,279,906 B2 | 3/2016 | Kang |
| 9,299,294 B2 | 3/2016 | Lin |
| 9,311,868 B2 | 4/2016 | Lim et al. |
| 9,373,289 B2 | 6/2016 | Sprague |
| 9,390,066 B2 | 7/2016 | Smith |
| 9,390,661 B2 | 7/2016 | Chiu |
| 9,412,314 B2 | 8/2016 | Amundson |
| 2003/0102858 A1 | 6/2003 | Jacobson et al. |
| 2004/0246562 A1 | 12/2004 | Chung |
| 2005/0253777 A1 | 11/2005 | Zehner et al. |
| 2005/0285500 A1 | 12/2005 | Hattori |
| 2006/0087479 A1 | 4/2006 | Sakurai et al. |
| 2006/0087489 A1 | 4/2006 | Sakurai et al. |
| 2006/0209008 A1 | 9/2006 | Nihei et al. |
| 2006/0214906 A1 | 9/2006 | Kobayashi et al. |
| 2006/0227196 A1 | 10/2006 | Zhou et al. |
| 2006/0231401 A1 | 10/2006 | Sakurai et al. |
| 2007/0091418 A1 | 4/2007 | Danner et al. |
| 2007/0103427 A1 | 5/2007 | Zhou |
| 2007/0115274 A1 | 5/2007 | Shih |
| 2007/0176912 A1 | 8/2007 | Beames |
| 2008/0001876 A1* | 1/2008 | Ito .................. G09G 3/3655 345/87 |
| 2008/0024429 A1 | 1/2008 | Zehner |
| 2008/0024482 A1 | 1/2008 | Gates |
| 2008/0136774 A1 | 6/2008 | Harris |
| 2008/0291129 A1 | 11/2008 | Harris |

(56) References Cited

U.S. PATENT DOCUMENTS

| | | |
|---|---|---|
| 2008/0303780 A1 | 12/2008 | Sprague |
| 2009/0004442 A1* | 1/2009 | Danner .................. B32B 37/24 428/195.1 |
| 2009/0174651 A1 | 7/2009 | Jacobson |
| 2009/0195568 A1 | 8/2009 | Sjodin |
| 2009/0322721 A1 | 12/2009 | Zehner |
| 2010/0079428 A1* | 4/2010 | Kajino .................. G09G 3/344 345/208 |
| 2010/0194789 A1 | 8/2010 | Lin |
| 2010/0220121 A1 | 9/2010 | Zehner |
| 2010/0265561 A1 | 10/2010 | Gates et al. |
| 2010/0283804 A1 | 11/2010 | Sprague |
| 2011/0063314 A1 | 3/2011 | Chiu |
| 2011/0175875 A1 | 7/2011 | Lin |
| 2011/0193840 A1 | 8/2011 | Amundson |
| 2011/0193841 A1 | 8/2011 | Amundson |
| 2011/0199671 A1 | 8/2011 | Amundson |
| 2011/0221740 A1 | 9/2011 | Yang |
| 2012/0001957 A1 | 1/2012 | Liu |
| 2012/0098740 A1 | 4/2012 | Chiu |
| 2012/0249507 A1 | 10/2012 | Chung et al. |
| 2013/0063333 A1 | 3/2013 | Arango |
| 2013/0063409 A1 | 3/2013 | Chiu et al. |
| 2013/0194250 A1 | 8/2013 | Amundson |
| 2013/0249782 A1 | 9/2013 | Wu |
| 2013/0321278 A1 | 12/2013 | Sjodin et al. |
| 2014/0009817 A1 | 1/2014 | Wilcox et al. |
| 2014/0085355 A1 | 3/2014 | Chang |
| 2014/0104155 A1* | 4/2014 | Long ..................... G09G 3/344 345/107 |
| 2014/0204012 A1 | 7/2014 | Wu |
| 2014/0218277 A1 | 8/2014 | Cheng |
| 2014/0240210 A1 | 8/2014 | Wu |
| 2014/0240373 A1 | 8/2014 | Harrington |
| 2014/0253425 A1 | 9/2014 | Zalesky |
| 2014/0292830 A1 | 10/2014 | Harrington et al. |
| 2014/0293398 A1 | 10/2014 | Wang |
| 2014/0333685 A1 | 11/2014 | Sim |
| 2014/0340734 A1 | 11/2014 | Lin |
| 2015/0005720 A1 | 1/2015 | Zang |
| 2015/0070744 A1 | 3/2015 | Danner et al. |
| 2015/0097877 A1 | 4/2015 | Lin |
| 2015/0108986 A1* | 4/2015 | Van Lier ............ G01R 27/2605 324/414 |
| 2015/0109283 A1 | 4/2015 | Gates |
| 2015/0213749 A1 | 7/2015 | Lin |
| 2015/0213765 A1 | 7/2015 | Gates |
| 2015/0221257 A1 | 8/2015 | Wilcox et al. |
| 2015/0262255 A1 | 9/2015 | Khajehnouri |
| 2015/0277160 A1 | 10/2015 | Laxton |
| 2016/0012710 A1 | 1/2016 | Lu |
| 2016/0071465 A1 | 3/2016 | Hung |
| 2016/0078820 A1 | 3/2016 | Harrington |
| 2016/0093253 A1 | 3/2016 | Yang |
| 2016/0140910 A1 | 5/2016 | Amundson |
| 2016/0180777 A1 | 6/2016 | Lin |

FOREIGN PATENT DOCUMENTS

| | | |
|---|---|---|
| KR | 20100071702 | 6/2010 |
| KR | 20110065754 A | 6/2011 |
| KR | 20110068434 | 6/2011 |
| KR | 20130077252 | 7/2013 |
| WO | 2004079442 | 9/2004 |

OTHER PUBLICATIONS

Yamaguchi, Y., et al., "Toner display using insulative particles charged triboelectrically", Asia Display/IDW '01, p. 1729, Paper AMD4-4 (2001) Jan. 1, 2001.

Kitamura, T., et al., "Electrical toner movement for electronic paper-like display", Asia Display/IDW '01, p. 1517, HCS1-1 (2001) Dec. 31, 2001.

European Patent Office, EP Appl. No. 16867187.3, Extended European Search Report, dated Oct. 10, 2018. Oct. 10, 2018.

\* cited by examiner

ELECTRO-OPTIC DISPLAYS

REFERENCE TO RELATED APPLICATIONS

This application is related to U.S. Provisional Application 62/256,931 filed on Nov. 18, 2015.

The entire disclosure of the aforementioned application is herein incorporated by reference.

BACKGROUND

Field

The present application relates to measurement and calibration of kickback voltage in electro-optic displays, in particular, for electrophoretic displays.

BRIEF SUMMARY

According to an aspect of the present application, an apparatus is provided, comprising a first electrode, a second electrode, an electro-optic material disposed between the first electrode and the second electrode, a control circuit coupled to the first electrode and configured to supply a voltage to the first electrode, and a capacitor. The apparatus further comprises a switch coupled to the first electrode. The switch is configured to: in a first switching state, couple the first electrode to the output of a display controller ("Vcom") and a capacitor; and in a second switching state, couple the first electrode to a measurement circuit (and not to the Vcom nor to the capacitor).

According to an aspect of the present application, an apparatus is provided, comprising a first electrode, a second electrode, and an electro-optic material disposed between the first electrode and the second electrode. The apparatus further comprises one or more switches configured to create, in a measurement mode, a measurement signal path in which a measurement circuit is coupled to the first electrode without including in the measurement signal path a capacitor which is configured to be coupled to the first electrode in a display mode of the apparatus.

According to an aspect of the present application, a method of measuring a kickback voltage of an electro-optic display incorporated into a device is provided. The method comprises initiating measurement of the kickback voltage upon occurrence of a trigger event associated with operation of the device.

BRIEF DESCRIPTION OF DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

DETAILED DESCRIPTION

Aspects of the present application relate to measurement of the kickback voltage in an electrophoretic display.

Electro-optic displays comprise a layer of electro-optic material, a term which is used herein in its conventional meaning in the imaging art to refer to a material having first and second display states differing in at least one optical property, the material being changed from its first to its second display state by application of an electric field to the material. In the displays of the present disclosure, the electro-optic medium may be a solid (such displays may hereinafter for convenience be referred to as "solid electro-optic displays"), in the sense that the electro-optic medium has solid external surfaces, although the medium may, and often does, have internal liquid- or gas-filled spaces.

Another type of electro-optic display is the particle-based electrophoretic display, in which a plurality of charged particles move through a suspending fluid under the influence of an electric field. Some attributes of electrophoretic displays are described in U.S. Pat. No. 6,531,997, titled "Methods for Addressing Electrophoretic Displays" and issued Mar. 11, 2003, which is hereby incorporated herein in its entirety.

Electrophoretic displays can have attributes of good brightness and contrast, wide viewing angles, state bistability, and low power consumption when compared with liquid crystal displays. Nevertheless, there may be problems with the long-term image quality of some particle-based electrophoretic displays. For example, particles that make up some electrophoretic displays may settle, resulting in inadequate service-life for such displays.

As noted above, electrophoretic media may include a suspending fluid. This suspending fluid may be a liquid, but electrophoretic media can be produced using gaseous suspending fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also European Patent Applications 1,429,178; 1,462,847; and 1,482,354; and International Applications WO 2004/090626; WO 2004/079442; WO 2004/077140; WO 2004/059379; WO 2004/055586; WO 2004/008239; WO 2004/006006; WO 2004/001498; WO 03/091799; and WO 03/088495. Some gas-based electrophoretic media may be susceptible to the same types of problems as some liquid-based electrophoretic media due to particle settling, when the media are used in an orientation which permits such settling, for example in a sign where the medium is disposed in a vertical plane. Indeed, particle settling appears to be a more serious problem in some gas-based electrophoretic media than in some liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT), E Ink Corporation, E Ink California, LLC. and related companies describe various technologies used in encapsulated and microcell electrophoretic and other electro-optic media. Encapsulated electrophoretic media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. In a microcell electrophoretic display, the charged particles and the fluid are not encapsulated within microcapsules but instead are retained within a plurality of cavities formed within a carrier medium, typically a polymeric film. [[Hereinafter, the term "microcavity electrophoretic display" may be used to cover both encapsulated and microcell electrophoretic displays.]] The technologies described in these patents and applications include:

(a) Electrophoretic particles, fluids and fluid additives; see for example U.S. Pat. Nos. 7,002,728 and 7,679,814;

(b) Capsules, binders and encapsulation processes; see for example U.S. Pat. Nos. 6,922,276 and 7,411,719;

(c) Microcell structures, wall materials, and methods of forming microcells; see for example U.S. Pat. Nos. 7,072,095 and 9,279,906;

(d) Methods for filling and sealing microcells; see for example U.S. Pat. Nos. 7,144,942 and 7,715,088***;

(e) Films and sub-assemblies containing electro-optic materials; see for example U.S. Pat. Nos. 6,982,178 and 7,839,564;

(f) Backplanes, adhesive layers and other auxiliary layers and methods used in displays; see for example U.S. Pat. Nos. 7,116,318 and 7,535,624;

(g) Color formation and color adjustment; see for example U.S. Pat. Nos. 7,075,502 and 7,839,564;

(h) Methods for driving displays; see for example U.S. Pat. Nos. 5,930,026; 6,445,489; 6,504,524; 6,512,354; 6,531,997; 6,753,999; 6,825,970; 6,900,851; 6,995,550; 7,012,600; 7,023,420; 7,034,783; 7,061,166; 7,061,662; 7,116,466; 7,119,772; 7,177,066; 7,193,625; 7,202,847; 7,242,514; 7,259,744; 7,304,787; 7,312,794; 7,327,511; 7,408,699; 7,453,445; 7,492,339; 7,528,822; 7,545,358; 7,583,251; 7,602,374; 7,612,760; 7,679,599; 7,679,813; 7,683,606; 7,688,297; 7,729,039; 7,733,311; 7,733,335; 7,787,169; 7,859,742; 7,952,557; 7,956,841; 7,982,479; 7,999,787; 8,077,141; 8,125,501; 8,139,050; 8,174,490; 8,243,013; 8,274,472; 8,289,250; 8,300,006; 8,305,341; 8,314,784; 8,373,649; 8,384,658; 8,456,414; 8,462,102; 8,537,105; 8,558,783; 8,558,785; 8,558,786; 8,558,855; 8,576,164; 8,576,259; 8,593,396; 8,605,032; 8,643,595; 8,665,206; 8,681,191; 8,730,153; 8,810,525; 8,928,562; 8,928,641; 8,976,444; 9,013,394; 9,019,197; 9,019,198; 9,019,318; 9,082,352; 9,171,508; 9,218,773; 9,224,338; 9,224,342; 9,224,344; 9,230,492; 9,251,736; 9,262,973; 9,269,311; 9,299,294; 9,373,289; 9,390,066; 9,390,661; and 9,412,314; and U.S. Patent Applications Publication Nos. 2003/0102858; 2004/0246562; 2005/0253777; 2007/0070032; 2007/0076289; 2007/0091418; 2007/0103427; 2007/0176912; 2007/0296452; 2008/0024429; 2008/0024482; 2008/0136774; 2008/0169821; 2008/0218471; 2008/0291129; 2008/0303780; 2009/0174651; 2009/0195568; 2009/0322721; 2010/0194733; 2010/0194789; 2010/0220121; 2010/0265561; 2010/0283804; 2011/0063314; 2011/0175875; 2011/0193840; 2011/0193841; 2011/0199671; 2011/0221740; 2012/0001957; 2012/0098740; 2013/0063333; 2013/0194250; 2013/0249782; 2013/0321278; 2014/0009817; 2014/0085355; 2014/0204012; 2014/0218277; 2014/0240210; 2014/0240373; 2014/0253425; 2014/0292830; 2014/0293398; 2014/0333065; 2014/0340734; 2015/0070744; 2015/0097877; 2015/0109283; 2015/0213749; 2015/0213765; 2015/0221257; 2015/0262255; 2016/0071465; 2016/0078820; 2016/0093253; 2016/0140910; and 2016/0180777;

(i) Applications of displays; see for example U.S. Pat. Nos. 7,312,784 and 8,009,348; and (j) Non-electrophoretic displays, as described in U.S. Pat. No. 6,241,921 and U.S. Patent Applications Publication No. 2015/0277160 and applications of encapsulation and microcell technology other than displays; see for example U.S. Patent Application Publications Nos. 2015/0005720 and 2016/0012710.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned 2002/0131147. Accordingly, for purposes of the present application, such polymer-dispersed electrophoretic media are regarded as sub-species of encapsulated electrophoretic media.

A related type of electrophoretic display is a so-called "microcell electrophoretic display." In a microcell electrophoretic display, the charged particles and the suspending fluid are not encapsulated within microcapsules but instead are retained within a plurality of cavities formed within a carrier medium, e.g., a polymeric film. See, for example, International Application Publication No. WO 02/01281, and published U.S. Application No. 2002/0075556, both assigned to Sipix Imaging, Inc.

Many of the aforementioned E Ink and MIT patents and applications also contemplate microcell electrophoretic displays and polymer-dispersed electrophoretic displays. The term "encapsulated electrophoretic displays" can refer to all such display types, which may also be described collectively as "microcavity electrophoretic displays" to generalize across the morphology of the walls.

The term "gray state" is used herein in its conventional meaning in the imaging art to refer to a state intermediate two extreme optical states of a pixel, and does not necessarily imply a black-white transition between these two extreme states. For example, several of the patents and published applications referred to below describe electrophoretic displays in which the extreme states are white and deep blue, so that an intermediate "gray state" would actually be pale blue. Indeed, as already mentioned the transition between the two extreme states may not be a color change at all.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse used to change the state of the display element. It is shown in published U.S. Patent Application No. 2002/0180687 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

A high-resolution display may include individual pixels which are addressable without interference from adjacent pixels. One way to obtain such pixels is to provide an array of non-linear elements, such as transistors or diodes, with at least one non-linear element associated with each pixel, to produce an "active matrix" display. An addressing or pixel electrode, which addresses one pixel, is connected to an appropriate voltage source through the associated non-linear element. When the non-linear element is a transistor, the pixel electrode may be connected to the drain of the transistor, and this arrangement will be assumed in the following description, although it is essentially arbitrary and the pixel electrode could be connected to the source of the transistor. In high resolution arrays, the pixels may be arranged in a two-dimensional array of rows and columns, such that any specific pixel is uniquely defined by the intersection of one specified row and one specified column. The sources of all the transistors in each column may be connected to a single column electrode, while the gates of all the transistors in each row may be connected to a single row electrode; again the assignment of sources to rows and gates to columns may be reversed if desired.

The display may be written in a row-by-row manner. The row electrodes are connected to a row driver, which may apply to a selected row electrode a voltage such as to ensure that all the transistors in the selected row are conductive, while applying to all other rows a voltage such as to ensure that all the transistors in these non-selected rows remain non-conductive. The column electrodes are connected to column drivers, which place upon the various column electrodes voltages selected to drive the pixels in a selected row to their desired optical states. (The aforementioned voltages are relative to a common front electrode which may be provided on the opposed side of the electro-optic medium from the non-linear array and extends across the whole display.) After a pre-selected interval known as the "line address time," a selected row is deselected, another row is selected, and the voltages on the column drivers are changed so that the next line of the display is written.

Active matrix displays may exhibit a so-called "kickback voltage", which is the pixel voltage just after pixel addressing (active update drive) minus the voltage applied to the pixel during pixel addressing. Kickback voltage is also referred to sometimes as "gate feedthrough voltage." The kickback voltage of an active matrix display depends on properties of the display, including properties of the display material, as well as the voltage(s) applied to the transistors of the active matrix display.

Self Erasing Definition

Up to this point, all dynamic ranges have been measured using extreme optical states determined at the end of a drive pulse. However, in assessing the real world performance of a bistable electro-optic display, it is necessary to take account of the phenomenon known as "self-erasing". Self-erasing is a phenomenon whereby, when an electro-optic display is driven from one extreme optical state to the opposed extreme optical state by application of a drive pulse and then allowed to stand with no electric field applied to the electro-optic medium, for a short time (typically a few seconds), the electro-optic medium relaxes back towards the one extreme optical state from which it was driven. For example, if an electro-optic medium is driven from black to white by a drive pulse and then the electric field is removed, the electro-optic medium will typically, over the next few seconds, move slightly back towards black, and the final state of the medium will be a very light gray. Since many applications of electro-optic media involve writing a desired image on a display and then allowing this image to remain on the display for a period which is much longer than the time it takes to write the image (for example, in an electronic book reader, it may take about one second to write a new page on the reader, and this page is then allowed to remain visible for the minute or so it takes the reader to read the page), it is the optical state of the medium after self-erasing has occurred which is of practical importance, since the major proportion of viewing of the display will occur after self-erasing has occurred.

The electrophoretic display may include an electrode configured as a common electrode, with a capacitance being coupled therewith. When measuring the kickback voltage, a measurement signal path may be dynamically created to measure the voltage on the common electrode while avoiding the capacitance coupled to the common electrode. In this manner, the voltage on the common electrode may settle more quickly than if the measurement signal path included the capacitance, allowing for measurement of the kickback voltage to be done sooner, which shortens the total time necessary for determining the kickback voltage value.

According to an aspect of the present application, the kickback voltage of an electrophoretic display may be measured multiple times, and not just during manufacture of the device. Although theoretically stable, in practice the kickback voltage of an electrophoretic display may vary over time. As a result, even a display which is initially calibrated to account for the kickback voltage may degrade in performance over time. Accordingly, aspects of the present application provide for the kickback voltage of an electrophoretic display to be measured at various points during the lifetime of the display. Optionally, the display may be calibrated based upon such measurements, providing long term performance enhancement.

The various aspects described above, as well as further aspects, will now be described in detail below. It should be appreciated that these aspects may be used alone, all together, or in any combination of two or more, to the extent that they are not mutually exclusive.

Figure 1:
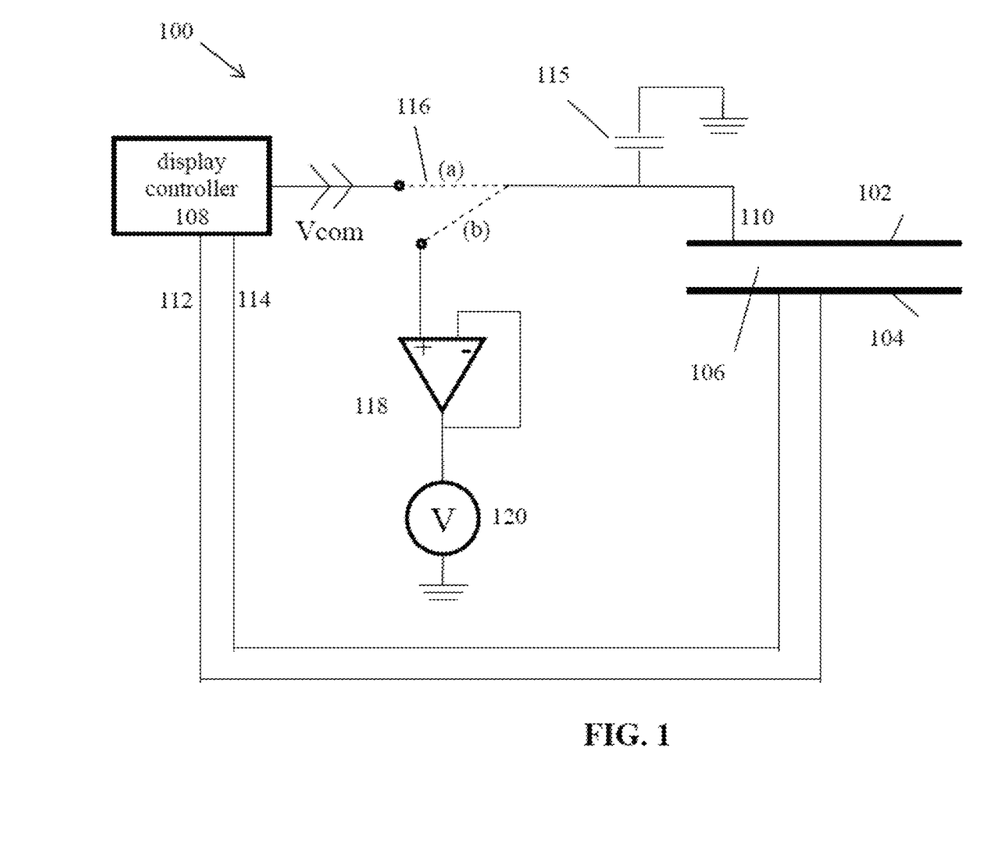
FIG. 1 is a schematic illustrating an active matrix display having a capacitor coupled to an electrode of the display, and a signal path for measuring a kickback voltage of the active matrix display and including the capacitor.

FIG. 1 is a schematic illustrating a configuration of a device including an active matrix display of a type to which aspects of the present application may apply. The device 100 includes a display portion having a first electrode 102 and a second electrode 104. An electro-optic material 106 is disposed between the first electrode 102 and second electrode 104. As a non-limiting example, the display may be an electrophoretic display, and therefore the electro-optic material 106 may be an electrophoretic material having one or more types of electrophoretic particles. In such situations, the electrophoretic particles may be contained within capsules, although not all embodiments are limited in this respect.

The display is an active matrix display, and therefore at least one of the first and second electrodes 102 and 104 may be configured (e.g., patterned) as a pixel electrode to define individual pixels (not shown). Preferably, the second electrode 104 will be configured as a pixel electrode. In the non-limiting embodiment illustrated, second electrode 104 may be the pixel electrode, and may represent a rear (or bottom) electrode of the display. First electrode 102 may represent a front (or top) electrode of the display, and may represent the viewing side of the display. That is, in use the first electrode 102 may be between the second electrode 104 and the user (not shown) viewing the display, and thus may be transparent. The first electrode 102 may be configured as a common electrode receiving a common voltage $V_{com}$.

The device 100 includes a display controller 108 configured to control operation of the display, for example by providing suitable waveforms to the first electrode 102 and/or second electrode 104. The display controller 108 includes the power circuitry that supplies power to the display module. Any suitable display controller may be used, such as a microcontroller, field programmable gate array, application specific integrated circuit (ASIC), or other controller. In the embodiment illustrated, the display controller is coupled to the first electrode 102 by a line 110, such as a metal trace, a wire, or other suitable connection. The display controller may provide the voltage $V_{com}$ to the first electrode 102 via line 110.

The display controller 108 is coupled to the second electrode 104 by lines 112 and 114, which may represent a gate control line and a source control line, respectively, for controlling the gate and source voltages of a transistor associated with the second electrode 104. In practice, each pixel of the display has a gate control line and a source control line, however, for purposes of simplicity only a single line of each type is illustrated.

The device 100 includes a capacitor 115 coupled to the first electrode 102. The capacitor may be provided to stabilize operation of the first electrode 102 by for example, providing a source of charge readily available to hold or maintain the first electrode 102 at a fixed or relatively constant voltage while the display's backplane voltages are rapidly changing during an image update, and this capacitor 115 may have any suitable capacitance for doing so. The capacitor 115 may be a discrete capacitor distinct from any parasitic capacitance of the first electrode 102. The capacitor 115 may be positioned near an edge of the first electrode 102, for example to avoid blocking any viewable portion of the display, or may be positioned at any other suitable location. Although a single capacitor 115 is illustrated, it should be appreciated that the capacitor 115 may in fact represent a plurality of capacitors.

The device 100 further comprises a switch 116. In a first configuration, the switch couples the first electrode to the output of a display controller ("Vcom") and a capacitor. In a second configuration, the switch couples the first electrode to a measurement circuit (and not to the Vcom output of the display controller and/or the capacitor). In both configurations of the switch, there is a capacitor attached to the conductor that is attached to the first electrode. The switch is provided for purposes of switching the device 100 between a display mode in which the display is operated as such, and a kickback voltage measurement mode in which the kickback voltage of the display is measured. In the display mode, the switch 116 assumes position (a) such that the display controller 108 is coupled to the first electrode 102 to provide $V_{com}$. In kickback voltage measurement mode, the switch 116 assumes position (b) in which the display controller 108 is decoupled from the first electrode 102 and instead the first electrode 102 is coupled to a measurement circuit including an operational amplifier 118 connected with negative feedback and a voltmeter 120. That is, a kickback voltage measurement signal path is created including the capacitor 115, the operational amplifier 118 and the voltmeter 120. The second electrode 104 is driven to zero (0) Volts. In this mode of operation, the voltage on the first electrode 102 will settle and provide an indication of the kickback voltage of the display. The measurement lasts sufficiently long to allow the voltage on the first electrode 102 to settle within acceptable standards (e.g., within acceptable manufacturing standards). Once the kickback voltage is known, the value of $V_{com}$ may be calibrated to account for the kickback voltage. For example, if the kickback voltage is determined to be negative one volts (−1 V), then Vcom may be set to negative one volts (−1 V) to compensate for the kickback voltage.

Although a specific measurement circuit is illustrated in FIG. 1 including the operational amplifier 118, it should be appreciated that alternative circuits exist. For example, the display controller 108 itself may include suitable circuitry for measuring the kickback voltage. For example, the measurement circuitry may be on a circuit board of the display controller 108.

The switch 116 may be any suitable type of switch. For example, the switch 116 may be a microfabricated switch integrated with the display, or may be any other suitable type of switch as the various aspects described herein are not limited in this respect.

Applicant has recognized and appreciated that measurement of the kickback voltage of a display using the configuration of FIG. 1 suffers from the drawback that the measurement takes a relatively long time, for example on the order of 10 seconds per display for a typical electrophoretic display. If the measurement is made during the manufacturing process for the display and a large number of displays is manufactured, the total measurement time required to measure the kickback voltage for all manufactured displays may be significant. If the measurement is made during end user operation of the device, for example when a user powers the device on, the required measurement time may represent an unacceptable delay in the user's ability to utilize the device, or at the least may represent an annoyance.

Applicant has further appreciated that the duration of measuring the kickback voltage using the configuration of FIG. 1 results at least in part from the presence of the capacitor 115 in the kickback voltage measurement signal path (when switch 116 is in position (b) in FIG. 1.) coupled with the resistance of the electro-optic material 106. The presence of capacitor 115 contributes to an RC time constant (in combination with the resistance R of the electro-optical material 106) which impacts the duration required to make the measurement of the kickback voltage. For example, assuming a display diagonal dimension on the order of 12 cm to 25 cm, a typical value for the capacitor 115 may be between 1 microFarad and 10 microFarads, while the resistance of the electro-optic material 106 may be between 300 kOhms and 1 MOhm (e.g., 600 kOhms), assuming the electro-optic material 106 is an electrophoretic material. Thus, the relaxation time may be on the order of several seconds, and it may be desirable to wait multiple relaxation time periods before determining the value of the kickback voltage.

Figure 2:
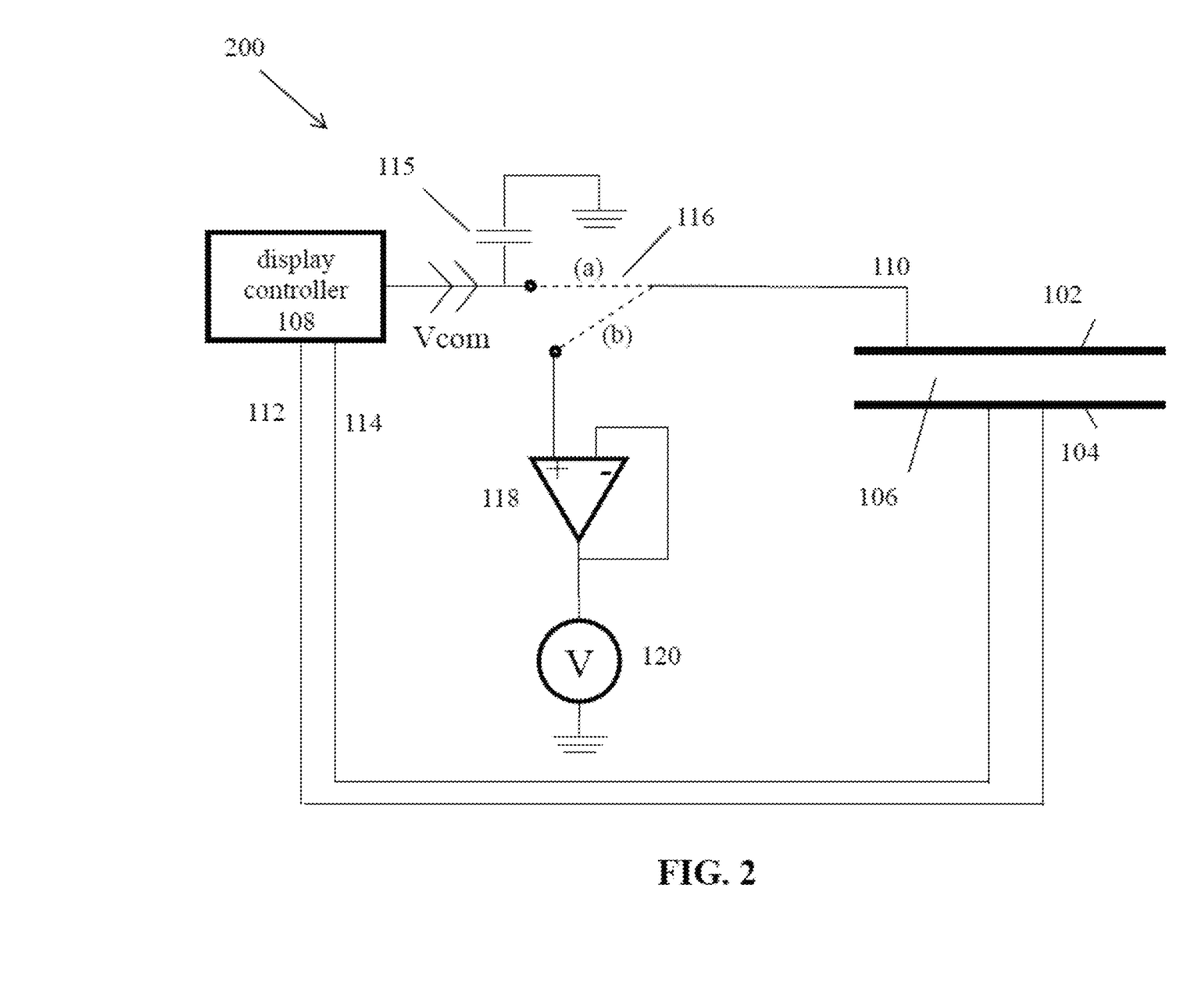
FIG. 2 is a schematic illustrating an active matrix display having a capacitor coupled to an electrode of the display, and a signal path for measuring a kickback voltage of the active matrix display and not including the capacitor, according to a non-limiting embodiment of the present application.

Thus, as described previously, an aspect of the present application provides for measurement of the kickback voltage of an electrophoretic display in a manner which utilizes a kickback voltage measurement signal path lacking a capacitance coupled to an electrode of the display from which the kickback voltage is measured. Reference is made to FIG. 2, which is a schematic of a device in accordance with this aspect of the present application.

Figure 4:
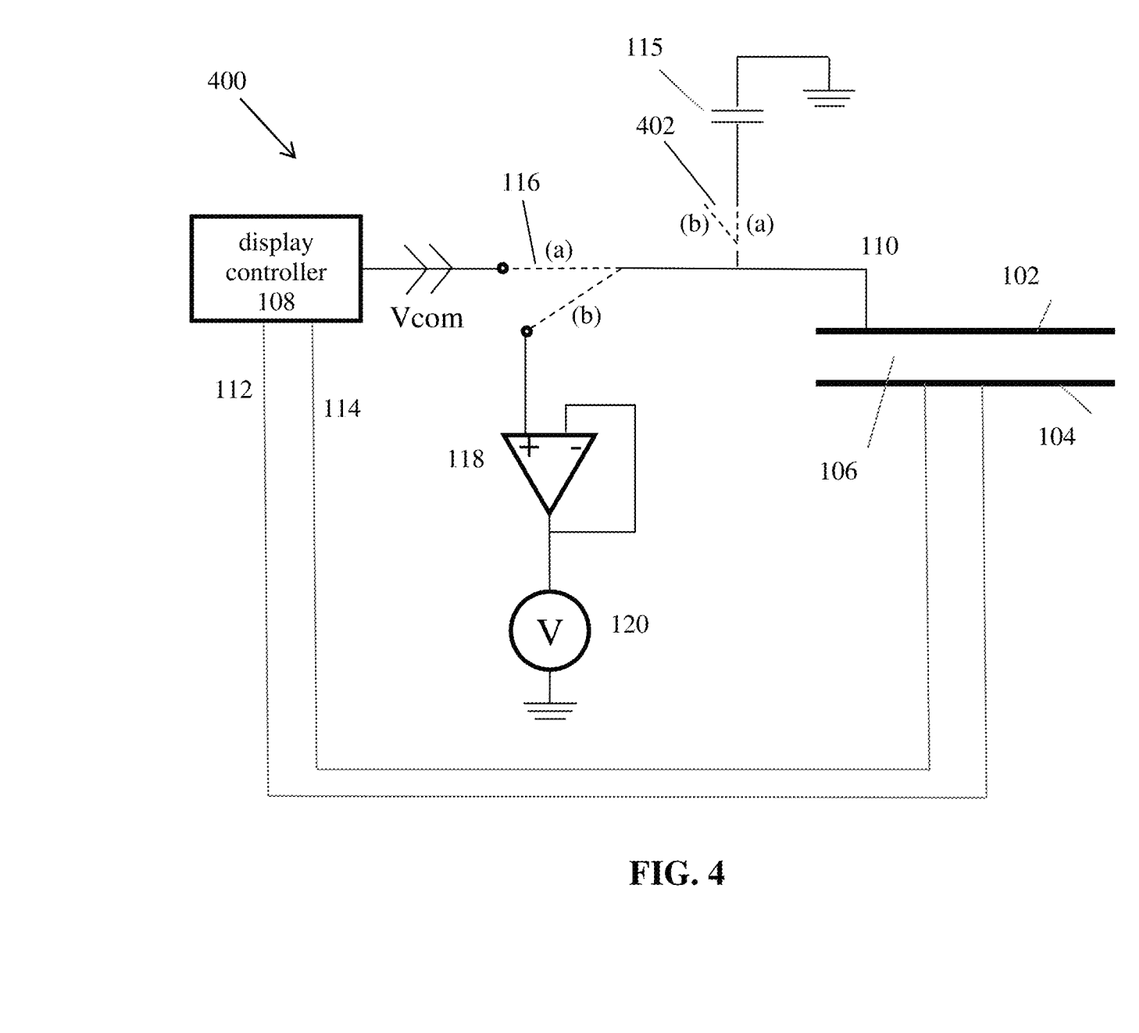
FIG. 4 is a schematic illustrating an alternative to FIG. 2 which includes multiple switches to allow for switch between a display mode of operation and a measurement mode for measuring the kickback voltage of the display.

The device 200 of FIG. 2 includes many of the same components as the device 100 of FIG. 1, but differs in the positioning of the capacitor 115 relative to the switch 116. In contrast to the arrangement in device 100, the switch 116 is positioned between the capacitor 115 and the first electrode 102 in the device 200. There is no difference in operation between the device 100 and device 200 when the switch 116 assumes position (a) in FIG. 2, namely when the device operates in a display mode. However, when the switch 116 assumes position (b) in device 200 to perform a measurement of the kickback voltage, a kickback voltage measurement signal path is created from the first electrode 102 to the operational amplifier 118 that bypasses or isolates (or otherwise avoids) the capacitor 115. Thus, the capacitor 115 does not contribute to an RC time constant of the kickback voltage measurement signal path in device 200, and as a result the voltage on the first electrode 102 will settle more quickly than will the voltage on the device 100 when the device 100 is used to measure kickback voltage. Some other embodiments incorporating the same working principle presented here can be readily implemented, as illustrated in FIG. 4 where an additional switch may be connected to the capacitor 115 to achieve the isolation of the capacitor 115 from the signal path.

The reduction in kickback voltage measurement duration achieved from using the configuration of FIG. 2 may be significant. For example, a reduction of greater than 50% may be realized, between 10% and 60%, between 20% and 40%, or any value or range of values within such ranges. As a specific non-limiting example, assuming that the configuration of FIG. 1 requires 10 seconds to make a kickback voltage measurement, the configuration of FIG. 2 may take 3 seconds or less. In some embodiments, a configuration like that shown in FIG. 2 may be able to perform measurement of the kickback voltage in less than 1 second, less than half a second, less than 100 milliseconds, or other suitable durations.

Figure 3A:
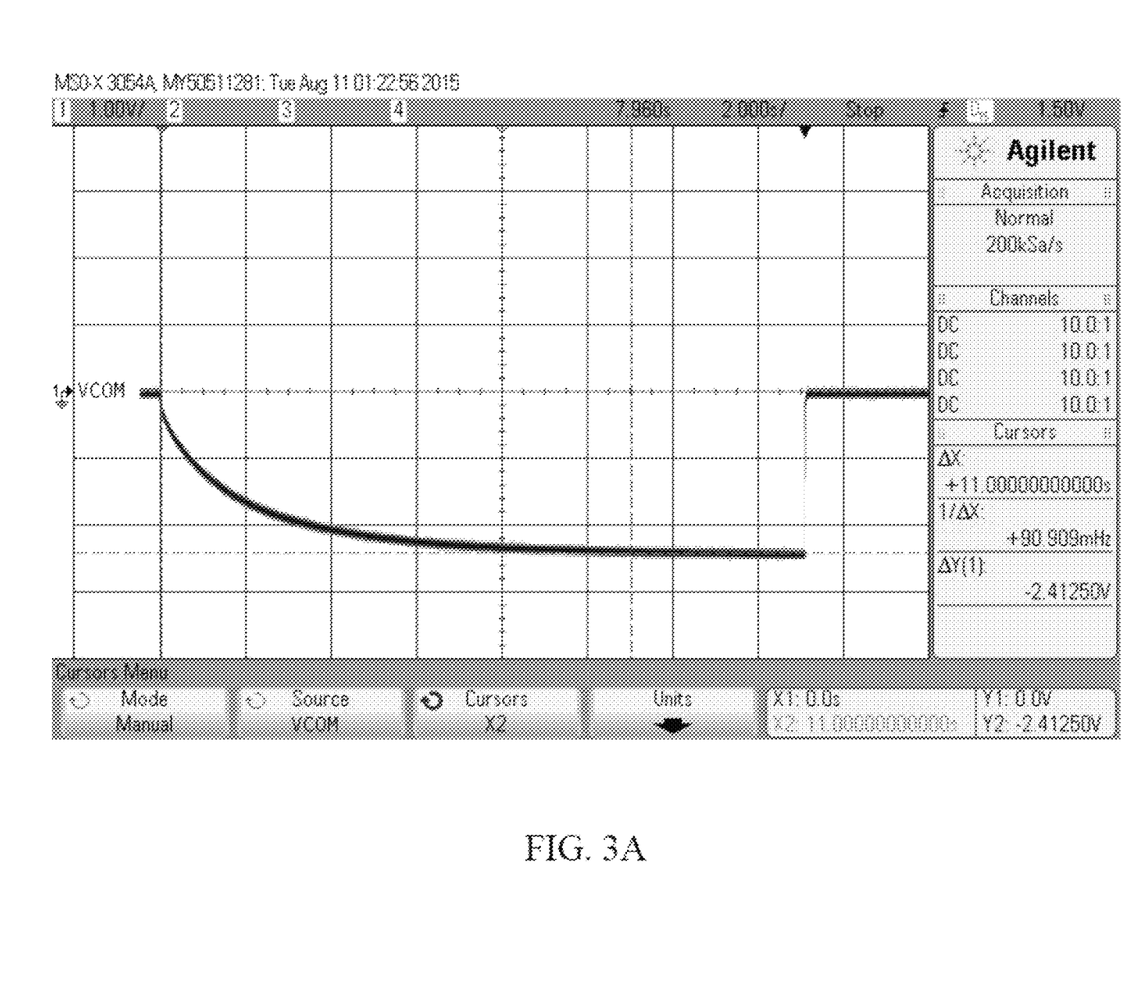
FIG. 3A is a graph showing the top plane voltage against time for an active matrix display of FIG. 1.
Figure 3B:
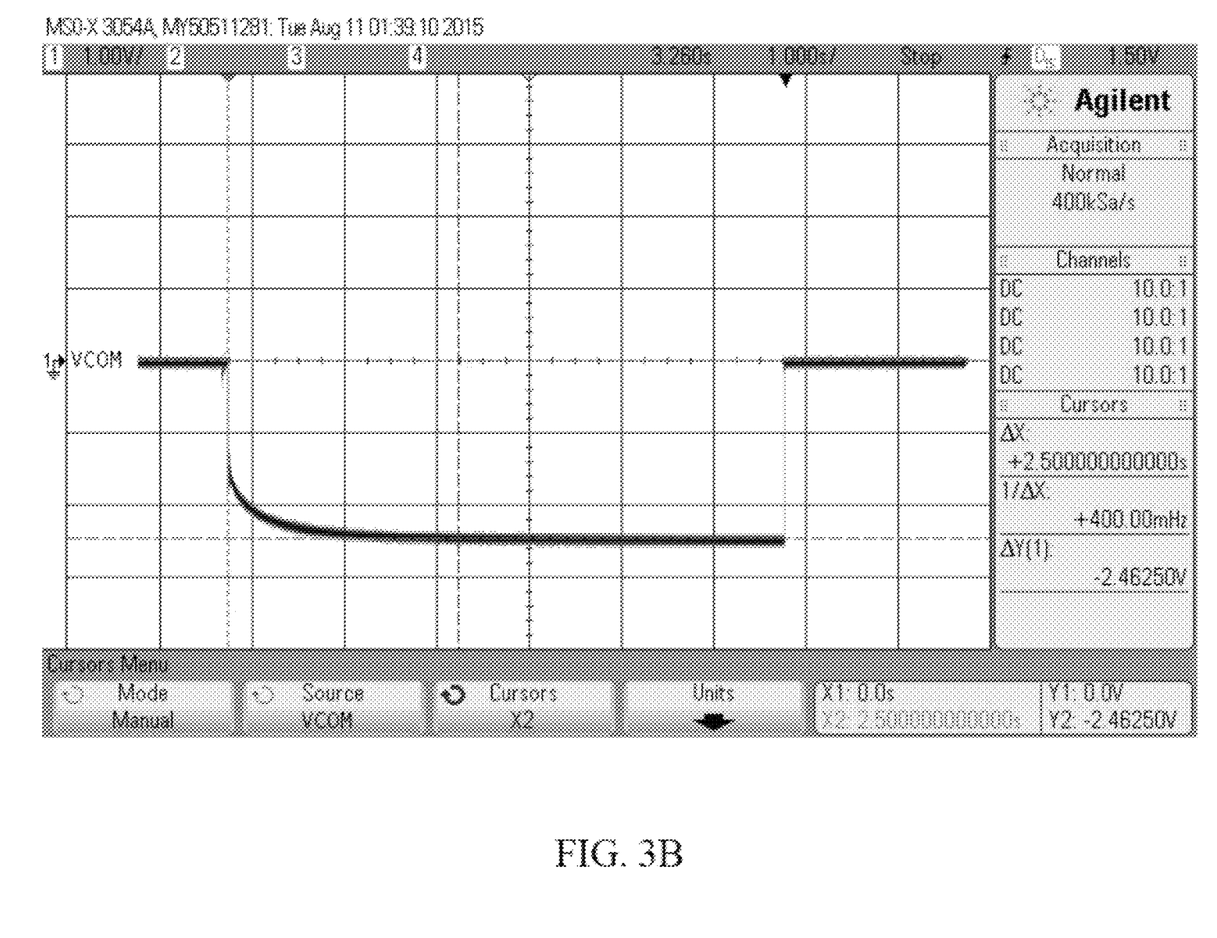
FIG. 3B is a graph showing the top plane voltage against time for an active matrix display of FIG. 2.

FIG. 3A is a graph showing the top plane voltage against time for an active matrix display configured according to FIG. 1. The kickback voltage value may be assumed to be equivalent to this top plane voltage value. As shown in FIG. 3A, the time duration for measuring the kickback voltage ($\Delta X$) is 11 seconds. FIG. 3B is a graph showing the top lane voltage against time for an active matrix display configured according to FIG. 2. The kickback voltage value may be assumed to be equivalent to this top plane voltage value. As shown in FIG. 3B, the time duration for measuring the kickback voltage ($\Delta X$) is 2.5 seconds, which is much less than the time duration required when using the configuration of FIG. 1. By changing the configuration of the circuitry, the time duration for measuring the kickback voltage may be reduced by about 2 to 3 times.

In the configuration of FIG. 2, it may be desirable to remove the capacitor 115 from a board on which the display module (comprising first and second electrodes 102 and 104) is disposed since the switch 116 may be part of the display controller 108. A circuit board of the display controller 108 may include a power management integrated circuit (PMIC), and the capacitor 115 may be added to this circuit board.

The device 200 of FIG. 2 represents an example of a single switch device configuration. It should be appreciated that multiple switch configurations are also possible for allowing measurement of the kickback voltage of an electrophoretic display utilizing a kickback voltage measurement signal path lacking (e.g., isolated from the signal path) the capacitor coupled to the common electrode of the display. Thus, it should be appreciated that single switch and multiple switch configurations for measuring the kickback voltage of an electrophoretic display while bypassing a capacitor coupled to a common electrode of the display are contemplated and encompassed by aspects of the present application.

Device 200 represents a non-limiting example in which a capacitor coupled to a common electrode of an electrophoretic display is bypassed when measuring the kickback voltage of the display. As an alternative, the capacitor 115 may represent multiple discrete capacitors and a kickback voltage measurement signal path may be configured to bypass or isolate some, but not all of the capacitors. For example, referring to FIG. 2, an alternative device configuration may include a capacitor in the location shown for capacitor 115 as well as a capacitor coupled between the switch 116 and the first electrode 102. In such an alternative configuration, switching the switch 116 to position (b) will create a kickback voltage measurement signal path which includes some, but not all, of the capacitance coupled to the first electrode 102. In this manner, the time required to make the measurement of the kickback voltage may be reduced compared to the configuration of device 100, but may not be reduced to the degree achieved by device 200. Thus, it may be desirable in at least some embodiments to position the switch(es) to bypass as much of the capacitance as possible, to maximize the reduction in kickback voltage measurement duration. In such situations, the multiple capacitors may optionally be disposed on a circuit board of the display controller 108, and one or more switches may be used to switch in and out the desired capacitances for a given mode of the operation of the device.

FIG. 4 illustrates yet another non-limiting example. As shown, the device 400 of FIG. 4 differs from the device 100 of FIG. 1 in that a second switch 402 is added between the first electrode 102 and the capacitor 115. To operate the device in a display mode, switches 116 and 402 are placed into positions (a), which couples the first electrode 102 to the display controller 108 (to receive $V_{com}$) and to capacitor 115. To measure the kickback voltage of the display, switches 116 and 402 are placed into positions (b), which disconnects the first electrode 102 from the capacitor 115 and connects the first electrode 102 to the operational amplifier 118.

In some embodiments, circuitry board of the display controller 108 may include a "base" or minimum capacitor having a value representing a minimum capacitance for the capacitor 115 for any display. Larger displays may require additional capacitance to be coupled to the first electrode 102, and thus such additional capacitors may be placed in a position in which they can be switched out of a kickback voltage measurement signal path. Alternatives are also possible.

The kickback voltage of a display may be measured at various times during the lifetime of the display. As a first example, the kickback voltage of a display can be measured after manufacturing of the display but prior to integration of the display into a device that ultimately contains the display, such as an electronic reader (eReader) device. For example, the kickback voltage of a display can be measured in a factory setting, for example just after manufacture of the display. In such situations, the measured kickback voltage may be documented, for example being denoted on the display through written means (e.g. a printed label on the display) or by writing the kickback voltage in an encoded fashion in digital memory that is integrated into the display.

It should be appreciated that if the kickback voltage is measured in the manufacturing setting (e.g., according to the example just described), the measurement should be made using transistor gate voltages that are substantially similar to those anticipated to be used in the end product display device. That is because, as previously described, the kickback voltage is partially a function of the transistor gate voltages used for an active matrix display.

As a second example, the kickback voltage of a display can be measured in the final-product device that incorporates the display, such as in an eReader. Such measurement may utilize circuitry of the type described herein (e.g., as shown in FIG. 2 or FIG. 4) incorporated into the final product. An algorithm to measure the kickback voltage could be enacted during, for example, some initiation process, such as when the device is first "powered up" and prior to general usage of the eReader. In such situations, the kickback voltage may be measured, and its value stored in encoded form within the eReader (or other final product) so that $V_{com}$ may be set appropriately during general operation of the device.

As a third example, the kickback voltage of a display device can be measured and stored a plurality of times in a final product device that incorporates the display. The measurement and re-measurement can be stimulated by one or more of various factors, non-limiting examples of which include initialization of the device (for example, upon first power-up of the device), and, for re-measurement, factors such as elapsed time since initialization or previous kickback voltage measurement, elapsed display usage since initialization or previous kickback voltage measurement, temperature change or history of temperature changes, and so on. A benefit of measuring kickback voltage at various times during the lifetime of a device is that the accuracy of the measured and stored kickback voltage value may be maintained, allowing for accurate updating of $V_{com}$ and therefore more optimal driving of the display device. This can be beneficial in display devices for which the kickback voltage value changes over time.

By way of specific, non-limiting, example, an eReader device may enact initial measurement and storage of a kickback voltage value upon an initialization process just after first power-up of the device. The eReader then tracks elapsed time since this initial measurement and storage of a kickback voltage. After an elapsed time of, for example, three months, the eReader enacts a second kickback voltage measurement and storage at a next trigger event, such as when the display device is powered up but there are no current user activities that require a display update (that is, when the display controller is not otherwise employed). After this kickback voltage re-measurement and storage, the elapsed timer is reset to zero. After the elapsed time once again reaches three months, the kickback voltage is re-measured and re-stored. This process is repeated as long or as many times as desired.

By way of another specific, non-limiting, example, an eReader device follows the algorithm just described in the previous specific example, but enacts a kickback voltage re-measurement and storage at a next trigger event after 10,000 display updates (rather than after three months of elapsed time).

By way of another specific, non-limiting, example, an eReader device follows the algorithm just described in the previous two specific examples, but enacts a kickback voltage re-measurement and storage at a next trigger event after usage of the display device for a time duration (or elapsed time duration, that is, sum of time durations) greater than a specified duration (or integrated duration) at temperatures that exceed a specified value.

Aspects of the present application may provide one or more of the following benefits. It should be appreciated that not all aspects necessarily provide each of the following benefits, and that benefits other than those listed may be provided. Some aspects of the present application provide a reduced time requirement for measuring the kickback voltage of an electro-optic display. Some aspects provide a mechanism by which kickback voltage of an electro-optic display can be measured multiple times during the lifetime of the display. Thus, calibration of the display may be performed at multiple times, improving or optimizing performance of the display.

Variations on the embodiments described herein are possible. For example, while various embodiments have been described as relating to use with electrophoretic displays, use of other electro-optic displays is also possible. More generally, aspects of the present application may apply to displays of any type exhibiting a kickback voltage.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. For example, those of ordinary skill in the art will readily envision a variety of other means and/or structures for performing the function and/or obtaining the results and/or one or more of the advantages described herein, and each of such variations and/or modifications is deemed to be within the scope of the embodiments described herein. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, kits, and/or methods described herein, if such features, systems, articles, materials, kits, and/or methods are not mutually inconsistent, is included within the scope of the present disclosure.

What is claimed is:

1. An apparatus, comprising:
   a common electrode;
   a second electrode;
   an electro-optic material disposed between the common electrode and the second electrode;
   a measurement circuit;
   a capacitor; and
   a switch coupled to the common electrode and configured to:
   in a first switching state, couple the common electrode to the capacitor and un-couple the common electrode to the measurement circuit; and
   in a second switching state, couple the common electrode to the measurement circuit and not to the capacitor.

2. The apparatus of claim 1, wherein the electro-optical material is an electrophoretic material.

3. The apparatus of claim 1, wherein the measurement circuit comprises an operational amplifier.

4. An electro-optic display comprising:
a common electrode positioned over a layer of electro-optic material and configured to drive the electro-optic material to display images;
a control circuit coupled to the common electrode and configured for switching between a first switching state to form a first signal path and a second switching state to form a second signal path;
a measurement circuit for measure kickback voltages; and
a capacitor configured for maintaining a constant voltage at the common electrode;
wherein the measurement circuit is isolated from the first signal path when the control circuit is in the first switching state, and the capacitor is isolated from the second signal path when the control circuit is in the second switching state.

5. An electro-optic display according to claim 4 wherein the electro-optic material comprises a rotating bichromal member or electrochromic material.

6. An electro-optic display according to claim 4 wherein the electro-optic material comprises an electrophoretic material comprising a plurality of electrically charged particles disposed in a fluid and capable of moving through the fluid under the influence of an electric field.

7. An electro-optic display according to claim 6 wherein the electrically charged particles and the fluid are confined within a plurality of capsules or microcells.

8. An electro-optic display according to claim 6 wherein the electrically charged particles and the fluid are present as a plurality of discrete droplets surrounded by a continuous phase comprising a polymeric material.

9. An electro-optic display according to claim 6 wherein the fluid is gaseous.

10. An electronic device comprising a display according to claim 4, wherein the electronic device comprises an electronic book reader, portable computer, tablet computer, cellular telephone, smart card, sign, watch, shelf label or flash drive.

11. A method for measuring a kickback voltage of an electro-optic display incorporated into a device, the device including a common electrode positioned over a layer of electro-optic material a control circuit coupled to the common electrode and configured to switch between a first switching state to form a first signal path and a second switching state to form a second signal path, and a capacitor configured to maintain a constant voltage at the common electrode, the method comprising:

initiating a measurement of the kickback voltage;

isolating the capacitor from the second signal path when the control circuit is in the second switching state.

12. The method of claim 11, wherein the initiating a measurement step further comprising of tracking usage hours of the device.

13. The method of claim 11, wherein the initiating a measurement step further comprising tracking elapsed time since a previous measurement.

14. The method of claim 11, wherein the initiating a measurement step further comprising powering on the device.

* * * * *